United States Patent Office 3,734,753
Patented May 22, 1973

3,734,753
PLASTICIZED SULFUR COMPOSITIONS
Carl C. Greco, Garnerville, and Donald J. Martin, Irvington, N.Y., assignors to Stauffer Chemical Company, New York, N.Y.
No Drawing. Continuation-in-part of application Ser. No. 536,657, Mar. 23, 1966. This application Feb. 4, 1969, Ser. No. 796,561
Int. Cl. C09d 11/00, 13/00
U.S. Cl. 106—19          3 Claims

ABSTRACT OF THE DISCLOSURE

A plasticized sulfur composition comprising the reaction product of sulfur and a dimercaptan of the formula:

HS—A—SH wherein A is selected from the group consisting of alkylene, chalcogen interrupted alkylene and diester radicals.

CROSS-REFERENCE TO RELATED APPLICATION

Continuation-in-part of application Ser. No. 536,657, entitled Plasticized Sulfur Compositions, filed Mar. 23, 1966 in the name of Carl C. Greco and Donald J. Martin, now abandoned.

BRIEF SUMMARY OF THE INVENTION

This invention relates to compositions for marking roads, highways and the like which are characterized by having high impact resistance, in addition to good hardness and color properties. More specifically, this invention is concerned with plasticized sulfur compositions which are prepared by reacting sulfur and a dimercaptan selected from the group consisting of alkylene, chalcogen interrupted alkylene, and acid ester dimercaptans.

The dimercaptans which can be utilized in the practice of the present invention can be represented by the following formula:

HS—A—SH wherein A is selected from the group consisting of, alkylene of from 2 to 20 carbon atoms inclusive, chalcogen interrupted alkylene of from 4 to 20 carbon atoms inclusive having at least 2 carbon atoms between interruptions, and a diester radical of the formula:

$$-X-\overset{O}{\underset{\parallel}{C}}-O-R-O-\overset{O}{\underset{\parallel}{C}}-X-$$

wherein R is alkylene of from 2 to 6 carbon atoms inclusive or chalcogen interrupted alkylene of from 4 to 10 carbon atoms inclusive having at least two carbon atoms between interruptions and X is alkylene of from 1 to 3 carbon atoms inclusive.

DETAILED DESCRIPTION OF THE INVENTION

Suitable plasticized sulfur compositions are formed when A is alkylene containing from 2 to 20 carbon atoms. It is preferred that A be alkylene of from 2 to 10 carbon atoms.

The alkylene radicals useful in the practice of the present invention are acyclic hydrocarbon moieties such that with the addition of two hydrogen atoms they become saturated aliphatic molecules. Linear and branched chain alkylene radicals are useful in the practice of the present invention.

When A is an interrupted alkylene radical containing from 4 to 20 carbon atoms with at least 2 carbon atoms between interruptions plasticized compositions suitable for use as road marker material are formed, but generally the most effective plasticizers have between 4 to 12 carbon atoms and most preferably 4 to 6 carbon atoms.

The term chalcogen as used herein means oxygen or sulfur.

Plasticized sulfur compositions can be formed with diester dimercaptan compounds when R is alkylene having from 2 to 6 carbon atoms and when R is chalcogen interrupted alkylene with from 4 to 10 carbon atoms having at least 2 carbon atoms between interruptions, but due to ready availability of raw materials and ease of preparation of the plasticizer compounds, the compounds with the lower number of carbon atoms are generally the preferred species for use in the practice of the present invention. The diester dimercaptan compounds generally are effective plasticizers when X contains from 1 to 3 carbon atoms.

The chalcogen interrupted alkylene radicals useful in the practice of the present invention can be illustrated by radicals such as the following:

—$(C_2H_4)$—O—$(C_2H_4)$—
—$(C_2H_4)$—S—$(C_2H_4)$—
—$(C_3H_6)$—O—$(C_3H_6)$—
—$(C_4H_8)$—S—$(C_4H_8)$—
—$(C_2H_4)$—O—$(C_2H_4)$—O—$(C_2H_4)$—
—$(C_2H_4)$—O—$(C_2H_4)$—O—$(C_2H_4)$
      —S—$(C_2H_4)$—O—$(C_2H_4)$—O—$(C_2H_4)$—

The above list of chalcogen interrupted alkylene radicals is illustrative only and not exhaustive of the chalcogen interrupted alkylene radicals which are useful in the practice of the present invention.

The dimercaptans of the present invention may be reacted with sulfur to plasticize the same in a dimercaptan-sulfur weight ratio of from 1:99 to 1:3 and preferably 5:95 to 1:4. It is desirable to add a small amount of an alkaline material to aid in combining the reactants, but none is required. A variety of bases may be used such as the alkali metal and alkaline earth metal carbonates and organic primary, secondary, and tertiary amines. Only a small amount is needed, generally less than 1.5% by weight of the final composition is sufficient.

In preparing the plasticized compositions, the sulfur may be first melted and then any fillers, dyes and pigments added with the dimercaptan, but the order of addition is not critical and the materials may be dry-mixed prior to heating. Suitable inert fillers include silicates, glass beads and the like. In preparing the compositions of the invention, the sulfur may be heated until in the molten state, i.e. from about 118° C. to about 250° C. It is preferable to maintain the temperature of the reaction mixture at about 150° C. since pure sulfur becomes viscous at 160° C. and higher temperatures raise the cost of processing. Since the compositions of the invention may be used in different applications, the most suitable sulfur to plasticizer ratio will have to be determined experimentally under varying use conditions.

Having less rigidity and greater impact resistance than unplasticized sulfur, the compositions of the invention have many uses in addition to their road marking use. For example, with clay products such as paving brick, sewer pipe, segmental sewer tile, sewer brick and the like, the novel compositions are used as jointing materials. They are especially useful when employed as brick fillers because of their low coefficient of thermal expansion and resistance to exuding. Other desirable properties include resistance to acid attack, action of lubricating oils or gasoline, and penetration by tree roots. Materials which may be mixed with the plasticized compositions to impart additional strength include coal and pumice.

The following examples will serve to illustrate the invention. All parts and percentages in said examples are on a weight basis.

EXAMPLE 1

79 parts of commercial sulfur in the molten state at a temperature of 135° C. was poured into a 250 cc. stainless steel beaker contained in a heating mantle. To this melt was added 20 parts of β,β'-dimercaptodiethyl ether, 1 part of calcium carbonate, and the melt was heated to 150° C. and maintained at this temperature for 30 minutes. The melt was poured into aluminum foil evaporating dishes approximately 2 inches in diameter and ½ inch high and allowed to cool to room temperature. The solid compositions were then tested for hardness and impact strength.

In performing the hardness test, two of the samples were tested with Shore B–2 durometer. Five readings were taken for each sample and the ten readings were averaged to give a hardness index of 45. Two unplasticized sulfur compositions heated to 150° C. and maintained at that temperature for 30 minutes were also subjected to this test and found to have a hardness of 95.

To test for impact strength, two samples of the plasticized compositions as well as the unplasticized sulfur compositions were subjected to the Gardner light duty impact tester which consists of dropping a one-pound ball on the sample from progressively higher heights until a cracking is noted on the reverse side of the sample. The two plasticized compositions were found to have an impact resistance of greater than 30 inch pounds, whereas the unplasticized sulfur compositions had an impact resistance of less than 2 inch pounds.

EXAMPLE 2

79 parts of sulfur, 20 parts of β,β'-dimercaptodiethyl thioether and 1 parts of calcium carbonate were reacted and tested for hardness and impact resistance according to the procedure of Example 1. The plasticized compositions were found to have a hardness of 79 and an impact resistance of 12.

EXAMPLE 3

79 parts of sulfur, 20 parts of triethylene glycol dimercaptan and 1 part of calcium carbonate were reacted and tested for hardness and impact resistance according to the procedure of Example 1. The plasticized compositions were found to have a hardness of 73 and an impact strength of 10.

EXAMPLE 4

A mixture of 20 grams of 3,6-dioxa-8-mercapto-octyl sulfide (HSCH$_2$CH$_2$OCH$_2$CH$_2$OCH$_2$CH$_2$SCH$_2$CH$_2$OCH$_2$CH$_2$OCH$_2$CH$_2$SH)

79 grams of sulfur and one gram of calcium carbonate were reacted for 30 minutes at 150° C. and tested for hardness and impact resistance according to the procedure of Example 1. The plasticized composition was found to have a hardness of 75 and an impact resistance of 12.

EXAMPLE 5

79 parts of sulfur, 20 parts of 1,6-hexanedimercaptan and 1 part of calcium carbonate were reacted and tested for hardness and impact resistance according to the procedure of Example 1. The plasticized compositions were found to have a hardness of 65 and an impact resistance of 13.

EXAMPLE 6

79 parts of sulfur, 20 parts of 1,10-decanedimercaptan and 1 part of calcium carbonate were reacted and tested for hardness and impact resistance according to the procedure of Example 1. The plasticized compositions were found to have a hardness of 70 and an impact resistance of 13.

EXAMPLE 7

79 parts of sulfur, 20 parts of 1,3-propane dimercaptan and 1 part of calcium carbonate were reacted and tested for hardness and impact resistance according to the procedure of Example 1. The plasticized compositions were found to have a hardness of 60 and an impact resistance of 6.

EXAMPLE 8

79 parts of sulfur, 20 parts of ethylene glycol bis(thioglycolate) and 1 part of calcium carbonate were reacted and tested for hardness and impact resistance according to the procedure of Example 1. The plasticized compositions were found to have a hardness of 70 and an impact resistance of 16.

EXAMPLE 9

89 parts of sulfur, 10 parts of ethylene glycol bis(thioglycolate) and 1 part of calcium carbonate were reacted and tested for hardness and impact resistance according to the procedure of Example 1. The plasticized compositions were found to have a hardness of 80 and an impact resistance of 12.

EXAMPLE 10

79 parts of sulfur, 20 parts of ethylene glycol bis(mercapto propionate) and 1 part of calcium carbonate were reacted and tested for hardness and impact resistance according to the procedure of Example 1. The plasticized compositions were found to have a hardness of 78 and an impact resistance of 8.

EXAMPLE 11

89 parts of sulfur, 10 parts of ethylene glycol bis(mercapto propionate) and 1 part of calcium carbonate were reacted and tested for hardness and impact resistance according to the procedure of Example 1. The plasticized compositions were found to have a hardness of 89 and an impact resistance of 5.

What is claimed is:

1. A composition for use in marking paved surfaces comprising the product of the reaction at from 118° C. to 250° C. of sulfur and a plasticizer of the formula:

$$HS-X-\overset{O}{\underset{\|}{C}}-OR-O-\overset{O}{\underset{\|}{C}}-X-SH$$

wherein R is selected from the group consisting of alkylene of from 2 to 6 carbon atoms inclusive and chalcogen interrupted alkylene which is selected from the group consisting of ether, thioether, polyether and polythioether moieties of from 4 to 10 carbon atoms inclusive having at least two carbon atoms between interruptions and X is alkylene of from 1 to 3 carbon atoms inclusive and chalcogen is oxygen or sulfur in a plasticizer-sulfur weight ratio of from 1:99 to 1:3.

2. The composition of claim 1 wherein the dimercaptan is ethylene glycol bis(thioglycolate).

3. The composition of claim 1 wherein the dimercaptan is ethylene glycol bis(mercapto propionate).

References Cited

UNITED STATES PATENTS

| | | | |
|---|---|---|---|
| 2,142,145 | 1/1939 | Patrick | 106—287 S X |
| 2,331,951 | 10/1943 | Wright et al. | 106—287 S X |
| 2,799,593 | 7/1957 | Seymour et al. | 106—287 S |
| 3,020,252 | 2/1962 | Hancock | 106—287 S UX |
| 3,306,000 | 2/1967 | Barnes | 106—286 X |
| 3,316,115 | 4/1967 | Barnes et al. | 106—287 S |
| 3,342,620 | 9/1967 | Molinet et al. | 106—287 S |
| 3,421,911 | 1/1969 | Greco et al. | 106—19 |
| 3,434,852 | 3/1969 | Louthan | 106—19 |
| 3,453,126 | 7/1969 | Greco et al. | 106—19 |
| 3,544,543 | 12/1970 | Greco et al. | 106—287 SC |

JOAN B. EVANS, Primary Examiner

U.S. Cl. X.R.

94—1.5; 106—287 SC